(12) United States Patent
Abramov et al.

(10) Patent No.: US 9,302,346 B2
(45) Date of Patent: Apr. 5, 2016

(54) PRECISION LASER SCORING

(75) Inventors: Anatoli Anatolyevich Abramov, Painted Post, NY (US); Qi Wu, Painted Post, NY (US); Naiyue Zhou, Painted Post, NY (US)

(73) Assignee: CORNING, INCORPORATED, Corning, NY (US)

( * ) Notice: Subject to any disclaimer, the term of this patent is extended or adjusted under 35 U.S.C. 154(b) by 1140 days.

(21) Appl. No.: 13/257,059

(22) PCT Filed: Mar. 19, 2010

(86) PCT No.: PCT/US2010/027906
§ 371 (c)(1),
(2), (4) Date: Sep. 16, 2011

(87) PCT Pub. No.: WO2010/108061
PCT Pub. Date: Sep. 23, 2010

(65) Prior Publication Data
US 2012/0000894 A1  Jan. 5, 2012

Related U.S. Application Data

(60) Provisional application No. 61/161,980, filed on Mar. 20, 2009.

(51) Int. Cl.
*B23K 26/40* (2014.01)
*B23K 26/073* (2006.01)
*B23K 26/08* (2014.01)
*C03B 33/09* (2006.01)

(52) U.S. Cl.
CPC ......... *B23K 26/0736* (2013.01); *B23K 26/0869* (2013.01); *B23K 26/361* (2015.10); *B23K 26/364* (2015.10); *B23K 26/40* (2013.01); *B23K 26/703* (2015.10); *C03B 33/091* (2013.01); *B23K 2201/40* (2013.01); *B23K 2203/50* (2015.10)

(58) Field of Classification Search
CPC combination set(s) only.
See application file for complete search history.

(56) References Cited

U.S. PATENT DOCUMENTS

| | | | | |
|---|---|---|---|---|
| 4,467,168 A | * | 8/1984 | Morgan et al. | 219/121.67 |
| 5,609,284 A | * | 3/1997 | Kondratenko | 225/1 |
| 5,622,540 A | * | 4/1997 | Stevens | 65/112 |
| 5,776,220 A | * | 7/1998 | Allaire et al. | 65/112 |
| 5,826,772 A | * | 10/1998 | Ariglio et al. | 225/2 |
| 5,984,159 A | * | 11/1999 | Ostendarp et al. | 225/93.5 |

(Continued)

FOREIGN PATENT DOCUMENTS

| | | | | |
|---|---|---|---|---|
| EP | 1724048 | 11/2006 | ............ | B23K 26/06 |
| JP | H1094892 A | 4/1998 | | |

(Continued)

OTHER PUBLICATIONS

W. Friedl (Grenzebach), "Laser cutting of float glass ribbon", VDMA Proceedings, Glasstec2004, Dusseldorf, Germany, Nov. 11, 2004 (in German).

*Primary Examiner* — Dana Ross
*Assistant Examiner* — Renee L Miller
(74) *Attorney, Agent, or Firm* — Harness, Dickey & Pierce, PLC

(57) ABSTRACT

Method and apparatus for laser scoring a sheet material. An elongated laser beam having S-mode intensity profile in the width direction and a flat-top-mode profile in the length direction is used to achieve high precision scoring. The invention can be used for scoring large-size glass substrates for LCD displays.

14 Claims, 3 Drawing Sheets

(56) References Cited

U.S. PATENT DOCUMENTS

| | | | |
|---|---|---|---|
| 6,112,967 A * | 9/2000 | Ostendarp et al. | 225/93.5 |
| 6,177,912 B1 * | 1/2001 | Izumi | 345/1.3 |
| 6,211,488 B1 * | 4/2001 | Hoekstra et al. | 219/121.72 |
| 6,252,197 B1 * | 6/2001 | Hoekstra et al. | 219/121.84 |
| 6,300,593 B1 * | 10/2001 | Powell | 219/121.68 |
| 6,323,932 B1 * | 11/2001 | Zhang et al. | 349/155 |
| 6,327,875 B1 * | 12/2001 | Allaire et al. | 65/103 |
| 6,407,360 B1 * | 6/2002 | Choo et al. | 219/121.67 |
| 6,420,678 B1 * | 7/2002 | Hoekstra | 219/121.75 |
| 6,437,284 B1 | 8/2002 | Okamoto et al. | |
| 6,483,074 B2 * | 11/2002 | Kresge | 219/121.7 |
| 6,489,588 B1 * | 12/2002 | Hoekstra et al. | 219/121.67 |
| 6,512,196 B1 * | 1/2003 | Yoon et al. | 219/121.67 |
| 6,541,730 B2 * | 4/2003 | Nam et al. | 219/121.67 |
| 6,563,082 B2 * | 5/2003 | Terada et al. | 219/121.72 |
| 6,590,181 B2 * | 7/2003 | Choo et al. | 219/121.68 |
| 6,713,720 B2 * | 3/2004 | Jeon et al. | 219/121.72 |
| 6,723,952 B2 * | 4/2004 | Choo et al. | 219/121.72 |
| 6,734,391 B2 * | 5/2004 | Jeon | 219/121.72 |
| 6,744,009 B1 * | 6/2004 | Xuan et al. | 219/121.67 |
| 6,800,831 B1 * | 10/2004 | Hoetzel | 219/121.72 |
| 7,441,680 B2 * | 10/2008 | Luettgens et al. | 225/2 |
| 7,608,214 B2 * | 10/2009 | Kuno et al. | 264/400 |
| 7,723,641 B2 * | 5/2010 | Fujii | 219/121.68 |
| 7,772,522 B2 * | 8/2010 | Matsumoto et al. | 219/121.72 |
| 7,820,941 B2 * | 10/2010 | Brown et al. | 219/121.69 |
| 8,011,207 B2 * | 9/2011 | Abramov et al. | 65/112 |
| 8,051,679 B2 * | 11/2011 | Abramov et al. | 65/112 |
| 8,053,704 B2 * | 11/2011 | Abramov et al. | 219/121.68 |
| 8,104,385 B2 * | 1/2012 | Hayashi et al. | 83/15 |
| 8,245,540 B2 * | 8/2012 | Abramov et al. | 65/105 |
| 8,258,427 B2 * | 9/2012 | Abramov et al. | 219/121.69 |
| 8,347,651 B2 * | 1/2013 | Abramov et al. | 65/105 |
| 8,539,795 B2 * | 9/2013 | Dannoux et al. | 65/97 |
| 8,629,978 B1 * | 1/2014 | Estevadeordal et al. | 356/28 |
| 2002/0006765 A1 * | 1/2002 | Michel et al. | 451/28 |
| 2002/0046995 A1 * | 4/2002 | Chang et al. | 219/121.69 |
| 2002/0115235 A1 * | 8/2002 | Sawada | 438/113 |
| 2002/0125221 A1 * | 9/2002 | Kresge | 219/121.7 |
| 2002/0170896 A1 * | 11/2002 | Choo et al. | 219/121.72 |
| 2003/0024909 A1 * | 2/2003 | Hoekstra et al. | 219/121.69 |
| 2003/0086182 A1 * | 5/2003 | Tanaka et al. | 359/719 |
| 2004/0169023 A1 * | 9/2004 | Tanaka | 219/121.73 |
| 2005/0029239 A1 * | 2/2005 | Matsumoto et al. | 219/121.72 |
| 2005/0181550 A1 * | 8/2005 | Tanaka | 438/150 |
| 2006/0021977 A1 * | 2/2006 | Menegus | 219/121.69 |
| 2006/0022008 A1 | 2/2006 | Brown et al. | |
| 2006/0178769 A1 * | 8/2006 | Brew et al. | 700/122 |
| 2006/0249495 A1 * | 11/2006 | Hall | 219/121.69 |
| 2007/0020897 A1 * | 1/2007 | Tanaka | 438/535 |
| 2008/0035611 A1 * | 2/2008 | Kuno et al. | 219/69.1 |
| 2008/0061043 A1 * | 3/2008 | Fujii | 219/121.69 |
| 2008/0063808 A1 * | 3/2008 | Stumpe et al. | 427/510 |
| 2008/0173687 A1 * | 7/2008 | Hoetzel | 225/2 |
| 2008/0198369 A1 * | 8/2008 | Sogard | 356/73 |
| 2008/0283509 A1 * | 11/2008 | Abramov et al. | 219/121.72 |
| 2009/0032505 A1 * | 2/2009 | Huang et al. | 219/121.67 |
| 2009/0038343 A1 * | 2/2009 | Gibson | 65/60.1 |
| 2009/0046297 A1 * | 2/2009 | Sogard | 356/498 |
| 2009/0126403 A1 * | 5/2009 | Abramov et al. | 65/29.18 |
| 2009/0311497 A1 * | 12/2009 | Aoki | 428/214 |
| 2011/0017713 A1 * | 1/2011 | Abramov et al. | 219/121.67 |

FOREIGN PATENT DOCUMENTS

| | | | |
|---|---|---|---|
| JP | 10197709 | 1/2000 | |
| JP | 2001007045 A | 1/2001 | |
| JP | 2003534132 A | 11/2003 | |
| JP | 2006060085 A | 3/2006 | |
| WO | WO97/07927 | 3/1997 | B23D 26/00 |
| WO | WO-0138039 A1 | 5/2001 | |

* cited by examiner

PRECISION LASER SCORING

This application claims the benefit of priority to U.S. Provisional Application No. 61/161,980 filed on Mar. 20, 2009.

TECHNICAL FIELD

The present invention relates to laser cutting technology. In particular, the present invention relates to cutting inorganic sheet materials, such as glass sheets, by using laser heating. The present invention is useful in, inter alia, precision scoring of LCD glass substrates.

BACKGROUND

Splitting a piece of inorganic material can be accomplished by mechanical equipment and processes, such as wire saw, band saw, and the like. For glass materials, splitting can be effected by mechanical scoring (i.e., forming a scoreline on a surface) followed by bending and splitting. Mechanical scoring requires the removal of part of the bulk or surface material via friction, resulting in the formation of particles. Such particles can contaminate or even damage the surface of the material subject to cutting. Moreover, the edge quality of a glass sheet produced by mechanical scoring and cutting often does not meet the stringent requirements of demanding applications, such as the production of LCD panels.

Laser scoring has been reported as an alternative cutting and scoring technology in lieu of mechanical scoring. A $CO_2$ laser with a wavelength of about 10.6 μm, when irradiated to an absorbing glass material, can cause the temperature of the exposed area to rise. With or without the assistance of a coolant, the tensile stress caused the thermal gradient resulting from the absorption of the irradiation can lead to the direct splitting of a glass sheet, or the formation of a line of defect ("vent") along which the glass sheet can be split with the assistance of mechanical bending.

Laser scoring process parameters such as speed, laser power, process window, residual stress etc. depend on a number of factors, including thermal characteristics of the glass and laser beam properties—beam shape, size and also its intensity profile.

In the production of large-size LCD panels and many other products utilizing glass substrates, it is highly desired that the as-cut glass substrate has a high edge quality, and can be produced with high speed and efficiency, even as the size of the glass substrate grows larger and large from one generation to the next. This has posed significant challenges to the traditional mechanical and laser scoring technologies alike.

Thus, there is a need of a precision glass cutting technology. The present invention, as an improvement to existing laser scoring technology, answers this and other needs.

SUMMARY

Several aspects of the present invention are disclosed herein. It is to be understood that the aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

According to a first aspect of the present invention, provided is a process for splitting a sheet, comprising the following steps:

(I) providing an elongated laser beam having a width W(LB) and a length L(LB) where intercepted by a surface of the sheet, an energy distribution along the width in S-mode, and an energy distribution along the length having a flat-top-mode profile;

(II) exposing part of the surface of the sheet along a score-line to the laser beam and causing the temperature of the exposed area to rise, wherein the total exposed area has a width W(EA), a length L(EA), W(EA)≈W(LB) (in certain embodiments, W(EA)/W(LB)≤1.4; in certain other embodiments, W(EA)/W(LB)≤1.3, in certain other embodiments, W(EA)/W(LB)≤1.2, in certain other embodiments W(EA)/W(LB)≤1.1, in certain other embodiments W(EA)/W(LB) ≤1.05), and the scoreline is within the exposed area and is essentially parallel to L(LB); and (III) splitting the sheet substantially linearly along the scoreline.

In a first embodiment of the process according to the first aspect of the present invention, in step (I), the laser beam as provided is an IR laser beam such as a $CO_2$ laser operating at about 10.6 μm wavelength. $CO_2$ laser can be absorbed by many inorganic glass materials, such as aluminosilicate glass materials for LCD glass substrates.

In a second embodiment of the process according to the first aspect of the present invention, step (II) comprises the following step (II-1):

(II-1) translating the laser beam in a direction essentially parallel to L(LB) along a scoreline in the exposed area on the surface of the sheet.

In certain specific embodiments of the second embodiment of the process according to the first aspect of the present invention described summarily supra, in step (II-1), the translation speed of the laser beam is at least 300 mm/s. In certain other embodiments, in step (II-1), the translation speed of the laser beam is at least 750 mm/s.

In a third embodiment of the process according to the first aspect of the present invention, in step (I), the laser beam provided has an aspect ratio of at least 30, in certain other embodiments at least 40, in certain other embodiments at least 50, in certain other embodiments at least 80, in certain other embodiments at least 100, in certain embodiments at least 200, in certain embodiments at most 400, in certain other embodiments at most 300.

In a fourth embodiment of the process according to the first aspect of the present invention, in step (I), the laser beam provided has a width in the range of from 0.5 mm to 3 mm.

In a fifth embodiment of the process according to the first aspect of the present invention, the sheet consists essentially of an inorganic glass material, glass-ceramic material or ceramic material. In certain specific embodiments of the fifth embodiment, the sheet consists essentially of an inorganic glass material. In certain specific embodiments of the fifth embodiment, the edge of the split glass sheets along the scoreline has a total waviness of not more than 50 μm.

In a seventh embodiment of the process according to the first aspect of the present invention, L(EA)≥2000 mm, in certain specific embodiments L(EA)≥2400 mm, in certain specific embodiments L(EA)≥2800 mm, in certain other specific embodiments L(EA)≥3000 mm.

In an eighth aspect of the process according to the first aspect of the present invention, the process further comprises the following step (IIa) between step (II) and step (III):

(IIa) cooling at least part of the exposed area by a fluid immediately upon exposure.

In certain specific embodiments of the eighth aspect of the process according to the first aspect of the present invention, described summarily supra, step (IIa) is carried out while part of the total exposed area is being exposed to the laser beam.

In a ninth aspect of the process according to the first aspect of the present invention, the process further comprises the following step (IIb) between step (II) and step (III):

(IIb) bending the glass sheet along the scoreline.

In a tenth aspect of the process according to the first aspect of the present invention, step (I) comprises the following steps (I-1) and (I-2):

(I-1) providing a circular laser beam having a diameter D(CLB) and an energy distribution in S-mode along any diameter thereof; and (I-2) converting the circular laser beam into the elongated laser beam by passing the circular laser beam through an optical assembly adapted for transforming the energy intensity distribution along L(LB) from S-mode to a flat-top-mode profile while maintaining an S-mode energy intensity distribution along W(LB).

In certain specific embodiments of the tenth embodiment of the process according to the first aspect of the present invention, in step (I-2), the optical assembly is chosen such that $W(LB) < D(CLB)$, in certain embodiments $W(LB) \leq 0.8D(CLB)$, in certain embodiments $W(LB) \leq 0.6D(CLB)$, in certain embodiments $W(LB) \leq 0.5D(CLB)$, in certain embodiments $W(LB) \leq 0.4D(CLB)$, in certain embodiments $W(LB) \leq 0.3D(CLB)$, in certain embodiments $W(LB) \leq 0.2D(CLB)$, in certain other embodiments $W(LB) \leq 0.1D(CLB)$, in certain other embodiments, $W(LB) \leq 0.05D(CLB)$, in certain other embodiments, $W(LB) \leq 0.03D(CLB)$.

In certain specific embodiments of the tenth embodiments of the process according to the first aspect of the present invention, in step (I-2), the optical assembly comprises a first lens (such as a focusing cylindrical lens) operating to decrease the dimension of the circular laser beam in the direction of W(LB), and a second lens (such as a diverging modified cylindrical lens) operating to (a) increase the dimension of the beam in the direction of L(LB) and (b) transform the energy distribution profile from S-mode to flat-top-mode in the direction of L(LB).

In certain specific embodiments of the tenth embodiment of the process according to the first aspect of the present invention, in step (I-2), the optical assembly comprises a single lens operating to (i) decrease the dimension of the circular laser beam in the direction of W(LB), and (ii) increase the dimension of and transform the energy distribution from S-mode to flat-top-mode in the direction of L(LB).

According to a second aspect of the present invention, provided is an apparatus for splitting a glass sheet along an essentially linear scoreline in a surface of the glass sheet, comprising:

(A) a laser generator adapted for generating a circular laser beam having a diameter D(CLB) and an energy distribution in S-mode along any diameter thereof; and (B) an optical assembly adapted for converting the circular laser beam into an elongated laser beam having a width W(LB) and a length L(LB) where intercepted by the surface of the glass sheet, an energy distribution in S-mode along the direction of W(LB), and an energy distribution in flat-top-mode along the direction of L(LB).

In a first embodiment of the apparatus according to the second aspect of the present invention, the apparatus further comprises:

(C) a nozzle adapted for delivering a stream of cooling fluid to the area of surface of the sheet to be exposed to the elongated laser beam.

In a second embodiment of the apparatus according to the second aspect of the present invention, the apparatus further comprises:

(D) a device for bending and splitting the glass sheet along the scoreline.

In a third embodiment of the apparatus according to the second aspect of the present invention, the optical assembly (B) comprises a first lens adapted for decreasing the dimension of the circular laser beam in the direction of W(LB), and a second lens adapted for (a) increasing the dimension of the beam in the direction of L(LB) and (b) transforming the energy distribution profile from S-mode to flat-top-mode in the direction of L(LB).

In certain specific embodiments of the third embodiment of the apparatus according to the second aspect of the present invention, the first lens is a focusing cylindrical lens, and the second lens is a diverging modified cylindrical lens.

In a fourth embodiment of the apparatus according to the second aspect of the present invention, the optical assembly (B) comprises a single lens adapted for (i) decreasing the dimension of the circular laser beam in the direction of W(LB), and (ii) increasing the dimension of the laser beam in the direction of L(LB) and transforming the energy distribution from S-mode to flat-top-mode in the direction of L(LB) of the laser beam.

One or more embodiments of one or more aspects of the present invention have the following advantages. First, due to the energy distribution profile of the laser beam along the width W(LB), very precise scoring can be achieved. Second, the level of precision can be achieved even for large size glass sheets having a cutting width of at least 2000 mm, even 2400 mm or above such as over 2800 mm, or even over 3000 mm. Third, high speed cutting of at least 750 mm/second can be effected by using the present invention while the glass is moving in a direction perpendicular to the direction of scoring relative to the earth, such as at the bottom of the draw area of a fusion down-draw glass making process.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DESCRIPTION

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, "a lens" includes embodiments having two or more such lenses, unless the context clearly indicates otherwise.

In the present disclosure, "laser scoring" and "laser cutting" are used interchangeably, meaning a process for splitting a bulk material, such as a glass sheet, by exposing the material to a laser beam, with or without mechanical assistance, such as mechanical bending along a scoreline.

Total waviness of the edge of the glass sheet is measured after: (i) the glass sheet is laser scored while the glass sheet is maintained essentially stationery relative to the earth and (ii) the glass sheet was split by mechanical bending along the scoreline.

I. Laser Scoring in General

The use of a $CO_2$ laser for glass scoring is discussed in, inter alia: Kondratenko, U.S. Pat. No. 5,609,284 entitled "Method of splitting non-metallic materials" (the '284 patent); commonly-assigned Allaire et al., U.S. Pat. No. 5,776,220 entitled "Method and apparatus for breaking brittle materials" (the '220 patent); Ostendarp et al. U.S. Pat. No. 5,984,159 entitled "Method and apparatus for cutting through a flat workpiece made of brittle material, especially glass" (the '159 patent); and commonly-assigned Allaire et al., U.S. Pat. No. 6,327,875 entitled "Control of median crack depth in laser scoring" (the '875 patent); Co-pending, co-assigned U.S. patent application Ser. No. 11/904,697, filed on Sep. 28, 2007 and entitled "LASER SCORING WITH FLAT PROFILE BEAM" (hereinafter "the '697 Patent"). The contents of the commonly-assigned '220, '875, '697 patents are incorporated herein by reference in their entireties.

Figure 1:
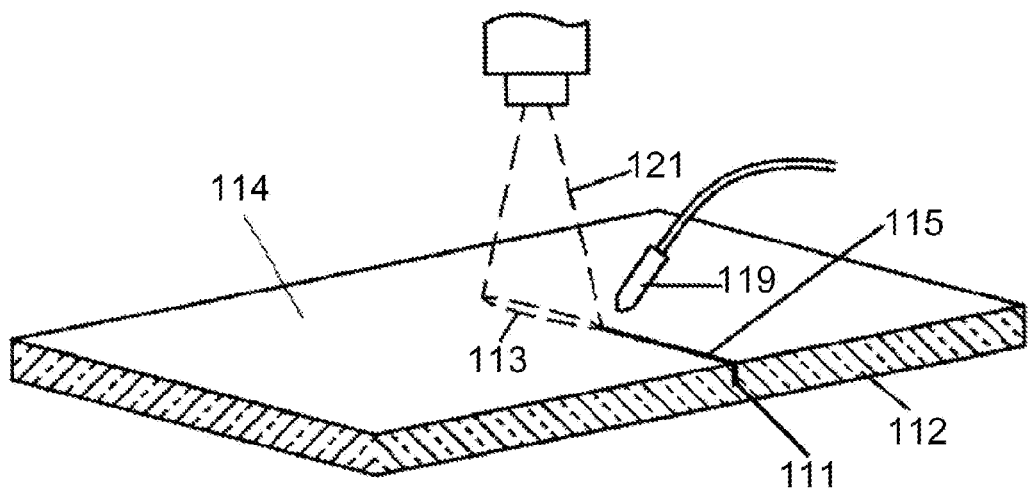
FIG. 1 is a diagram schematically showing the set-up of a laser scoring system according to one embodiment of the present invention.

As shown in FIG. 1, during laser scoring a median crack 115 (also known as a partial vent or, simply, a vent) is created in a major surface 114 of a glass sheet 112. In order to create the vent, a small initial flaw 111 is formed on the glass surface near one of its edges, which is then transformed into the vent by propagating laser light 121 formed into a beam 113 across the surface of the glass followed by a cooling area produced by a cooling fluid supplied by a cooling nozzle 119. Heating of the glass with a laser beam and quenching it immediately thereafter with a coolant creates a thermal gradient and a corresponding stress field, which is responsible for the propagation of the vent.

Laser beams having various shapes and sizes have been employed in the patents referred to above.

Laser scoring is typically performed using a carbon dioxide laser operating at a wavelength of 10.6 μm. At this wavelength the absorption of oxide glasses can exceed $10^5$-$10^6$ l/m, which makes the effective penetration depth of $CO_2$ radiation less than 1-10 μm. The desirable vent depth for successful scoring is in the range of 10-20% of the glass thickness, which corresponds to 70-140 μm for a substrate having a thickness of 0.7 millimeter. This means that formation of the vent during laser scoring mainly relies on thermal conductivity of the heat below the glass surface, which is a relatively slow process. Therefore, high surface absorption and thermal conductivity of the glass are two important factors that determine the process window and limit the scoring speed.

In order to reach the required tensile stress to form a vent the power density of the beam has to be high enough to provide a sufficient temperature differential at the surface of the glass. However, if the power density is too high, the energy delivered to each point on the glass surface along the score line during the exposure can cause an ablation or evaporation of the glass. Such high power densities can also result in high levels of residual stress both at the edge of a separated sub-piece and within the area adjacent to it. On the other hand, if the exposure time is short (when the scoring speed is high), the energy delivered to the glass may be insufficient to heat the glass below the surface and to create a deep vent.

Figure 3:
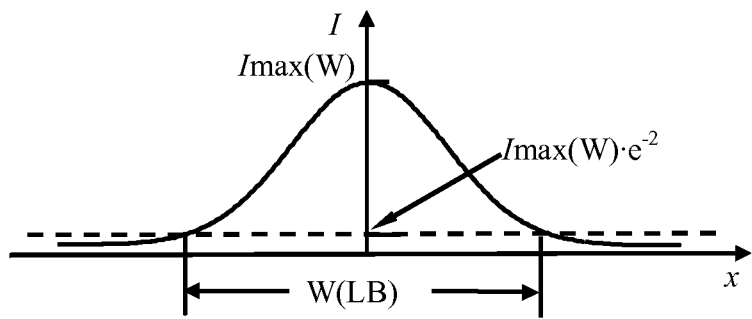
FIG. 3 is a diagram schematically showing the energy intensity profile of a Gaussian beam along an axis y.

As used herein, "S-mode" means the energy intensity distribution of the laser beam along a given direction is substantially Gaussian. FIG. 3 shows an S-mode distribution along an axis y. An exemplary S-mode would be the TEM00-Mode of a circular $CO_2$ laser beam along any diameter of the cross-section.

As used herein, "flat-top-mode" means the energy intensity distribution of the laser beam along a given direction is substantially non-Gaussian and exhibits a relatively flat top. D-mode, which is a combination of TEM00-Mode and TEM01*-Mode at various proportion, is an exemplary flat-top-mode. Co-pending, co-assigned U.S. patent application Ser. No. 11/904,697, filed on Sep. 28, 2007 and entitled "LASER SCORING WITH FLAT PROFILE BEAM" (hereinafter "the '697 Patent") discloses a plurality of laser beam flat-top-mode modes, the relevant portions thereof are incorporated herein by reference in their entirety. For example, one exemplary flat-top-mode as disclosed in this patent reference has a profile that can be approximated by the following mathematical representation:

$$I = A\left[e^{-2\left(\frac{x^2}{\omega_x^2}+\frac{y^2}{\omega_y^2}\right)} + B\left(\frac{x^2}{\omega_x^2}+\frac{y^2}{\omega_y^2}\right)e^{-2\left(\frac{x^2}{\omega_x^2}+\frac{y^2}{\omega_y^2}\right)}\right]$$

where: I is the laser beam energy intensity at location having coordinates (x, y), $\omega_x$ is a beam width parameter, $\omega_y$ is a beam length parameter, and A and B are constants to determine the shape and energy density of the laser beam. In a specific embodiment, A/B equals ½.

As mentioned supra, laser scoring has been reported in the literature previously. Beam energy distribution profile and beam shapes can have substantial effect on the laser scoring process. In conventional laser scoring processes, laser beams having a energy distribution profile in TEM00-Mode, which is essentially a Gaussian beam, have been used. The '697 Patent mentioned above teaches that laser beams with D-modes and other flat-top-modes can be more effective when compared to S-mode in heating up the glass without exceeding its strain temperature point and allow to achieve higher scoring speed without generation of excessive residual stress in the glass. Because of the wide and more uniform intensity profile, a flat-top-mode intensity distribution enables laser scoring with lower average power density within the beam, and as a result, wider process window in terms of power variation. Therefore, a flat-top-mode distribution along the length of a translating elongated beam is desired.

However, the width and intensity distribution along the width of the beam determines the width of exposed area on the glass surface, and the temperature the glass surface reaches, the temperature gradient profile, and hence the thermal stress profile. The thermal stress profile during laser scoring has great impact on the edge quality: waviness, strength, residual stress, and the like. It is believed that, along the width of the laser beam, an S-mode energy intensity distribution results in a more desirable temperature gradient than a flat-top-mode due to the narrower energy distribution, hence a more desirable stress profile. Therefore an S-mode along the width of the laser beam will result in lower waviness of the glass sheet along the scored edge.

The present invention can be used for precision cutting and scoring of various materials, although it will be illustrated below with respect to the embodiments where the sheet material to be cut or scored consists essentially of an inorganic glass material. However, one having ordinary skill in the art understands that, in the light of the teachings of the present invention, the processes and apparatuses of the present invention can be adapted for precision cutting of other sheet materials, such as organic polymer sheets and films, metal sheets and films, laminate materials comprising multiple sheets of materials having differing compositions and/or properties, and the like, mutatis mutandis.

II. Sheet Material

The present invention can be effectively applied to large-size glass sheets, such as the LCD glass sheets having a cutting width of at least 2000 mm, 2400 mm, 2500 mm, 2800 mm, or even at least 3000 mm. Because of the flat-top-mode of the beam in the length direction, among others, the cutting can be done at a high speed. Due to the S-mode of the beam in the direction of the beam width, the cutting can be done with high precision, such as with a total waviness along the cutting width of at most 50 µm, as discussed infra.

The present invention is particularly advantageous for cutting glass sheets having a thin thickness, e.g., an average thickness of at most 2 mm, in certain embodiments at most 1.5 mm, in certain embodiments at most 1.0 mm, in certain embodiments at most 0.8 mm, in certain other embodiments at most 0.5 mm.

III. Laser Generator

As mentioned supra, laser scoring is advantageously conducted by employing a $CO_2$ laser operating at a wavelength of about 10.6 µm. Radiation at this wavelength can be absorbed by a number of glass materials, such as the aluminosilicate glass materials typical of many current LCD glass substrates. Commercial $CO_2$ laser generators with power from several hundred watts to up to tens of kilowatt can be purchased on the market. Many commercially available laser generators provide a laser beam having a circular beam shape and a Gaussian energy distribution profile along any diameter thereof. Such circular Gaussian beam can be modified for use in certain embodiments of the present invention to achieve a high scoring speed, high scoring precision and high scored edge quality.

IV. Shape and Energy Distribution of the Laser Beam

As described herein, the characteristics and dimensions of the laser beam are those of the beam where intercepted by the surface of the sheet to be scored. It is to be understood that the laser beam may have different shapes, characteristics and dimensions at other spatial locations in the propagation path thereof.

Figure 2:
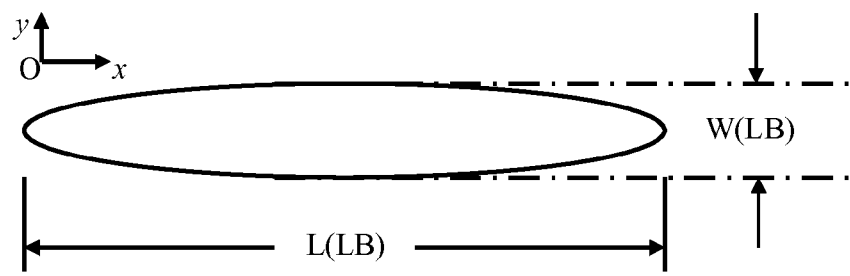
FIG. 2 is a diagram schematically showing the shape and dimension of a laser beam where intercepted by a planar glass surface operating according to one embodiment of the present invention.

An elongated laser beam is particularly advantageous for the present invention. FIG. 2 schematically illustrates an elongated elliptical beam that can be used in certain embodiments of the present invention having a length L(LB) and a width W(LB). It is highly desirable that the dimension L(LB) and W(LB) of the beam remain essentially constant at the various location of the surface of the glass sheet intercepting the laser beam. To that end, it is highly desired that the surface of the glass substrate remains essentially flat, i.e., with negligible curvature in both the direction of the length of the beam (x axis) and the direction of the width of the beam (y axis). Substantially consistent laser beam shape and dimension on the scoring surface enable substantially consistent laser energy delivery to the parts of the exposed surface, hence a consistent temperature gradient along the scoreline, which is required for consistent, successful scoring with high scored edge quality.

FIG. 3 schematically illustrates the Gaussian energy distribution profile along the width (y axis) of a laser beam according to one embodiment of the present invention. The profile exhibits a maximal intensity Imax(W) along the width and a width W(LB). In the present disclosure, beam width W(LB) is defined as the linear distance in the width direction from the point on one side of the beam having an intensity of Imax(W)·$e^{-2}$ to the point on the opposite side having an intensity of Imax(W)·$e^{-2}$, where e is Euler's irrational number.

A narrow beam is desired for successful scoring of glass sheets with high edge quality. Thus, in certain embodiments of the present invention, it is desired that the laser beam intercepted by the exposed surface has a beam width W(LB) from 0.5 mm to 3 mm, in certain embodiments from 0.5 mm to 2.5 mm, in certain embodiments from 0.8 to 2.0 mm. Such narrow beam delivers concentrated laser energy in a confined width needed to create a narrow and consistent vent on the glass surface.

Figure 4:
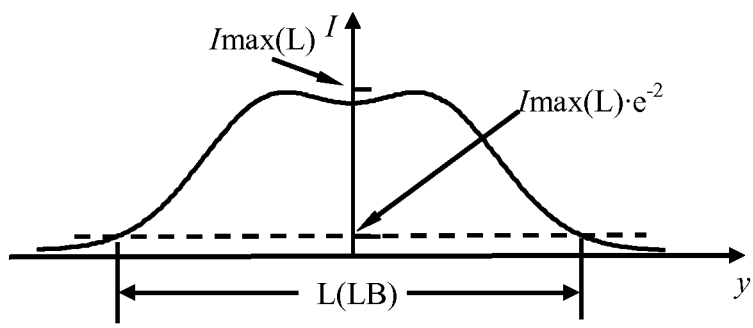
FIG. 4 is a diagram schematically showing the energy intensity profile in a D-mode along an axis x.

FIG. 4 schematically illustrates the D-mode energy distribution profile along the length (x axis) of a laser beam according to one embodiment of the present invention. The profile exhibits a maximal intensity Imax(L) along the length and a length L(LB). In the present disclosure, beam length L(LB) is defined as the linear distance in the length direction from the point on one end of the beam having an intensity of Imax(L)·$e^{-2}$ to the point at the opposite end having an intensity of Imax(L)·$e^{-2}$.

Figure 5:
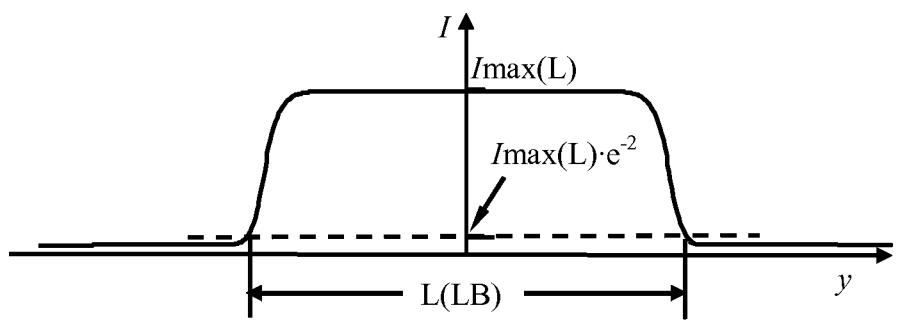
FIG. 5 is a diagram schematically showing the energy intensity profile in a flat-top-mode along an axis x.

Similarly, FIG. 5 schematically illustrates the flat-top-mode distribution profile along the length (x axis) of a laser beam according to another embodiment of the present invention.

An elongated laser beam having a length from 60 mm to 300 mm, in certain embodiments from 60 mm to 200 mm, in certain embodiments from 75 mm to 150 mm, is especially desirable to achieve high-speed laser scoring at a scoring speed of at least 300 mm/second, in certain embodiments at least 500 mm/second, in certain embodiments at least 600 mm/second, in certain embodiments at least 750 mm/second. For glass sheets moving in a direction perpendicular to the scoreline relative to the earth (even though the laser beam may maintain substantially stationery relative to the sheet and/or scoreline during the laser exposure process in the direction perpendicular to the scoreline), it is highly desired that the laser scoring speed is at least 750 mm/second, in order to, inter alia, minimize the impact of the scoring process on the upstream and downstream process steps. Scoring speed as high as 1000 mm/second, in certain embodiments 1200 mm/second, in certain other embodiments 1400 mm/second, has been achieved.

The aspect ratio of a laser beam is defined as the ratio of beam length L(LB) to beam width W(LB). For high speed laser scoring of glass sheets, an aspect ratio of at least 30, in certain other embodiments at least 40, in certain other embodiments at least 50, in certain other embodiments at least 80, in certain other embodiments at least 100, in certain embodiments at least 200, in certain embodiments at most 400, in certain embodiments at most 300, is desired.

V. Optical Assembly for Beam Modification

A commercial $CO_2$ laser typically provides a circular laser beam having a Gaussian energy distribution profile along any diameter thereof. The beam can be modified at a location proximal to the laser source with beam expanders or other optics to obtain a circular laser beam having a diameter D(CLB) for use in the present invention.

The circular laser beam having a diameter D(CLB) is then further modified by an optical assembly to have the desired beam size and energy distribution profile. In certain embodiments, the optical assembly provides the following two functions, inter alia: (i) expanding the beam length-wise while modifying the intensity distribution in the length direction from S-mode to a flat-top-mode; and (ii) focusing the beam in the width direction of the beam delivered to the surface of the glass sheet to be scored while maintaining the intensity profile in an S-mode. The first function can be performed by a first, modified cylindrical, lens having a diverging surface in the length direction of the beam. The second function can be performed by a second cylindrical lens having a focusing surface in the width direction of the beam. If the diverging surface of the second lens is perfectly cylindrical, the beam would diverge while maintaining the S-mode distribution profile. By modifying the diverging surface of the second lens to a proper profile, one can obtain a diverging output beam with a flat-top-mode intensity distribution in the length direction of the beam.

Figure 6:
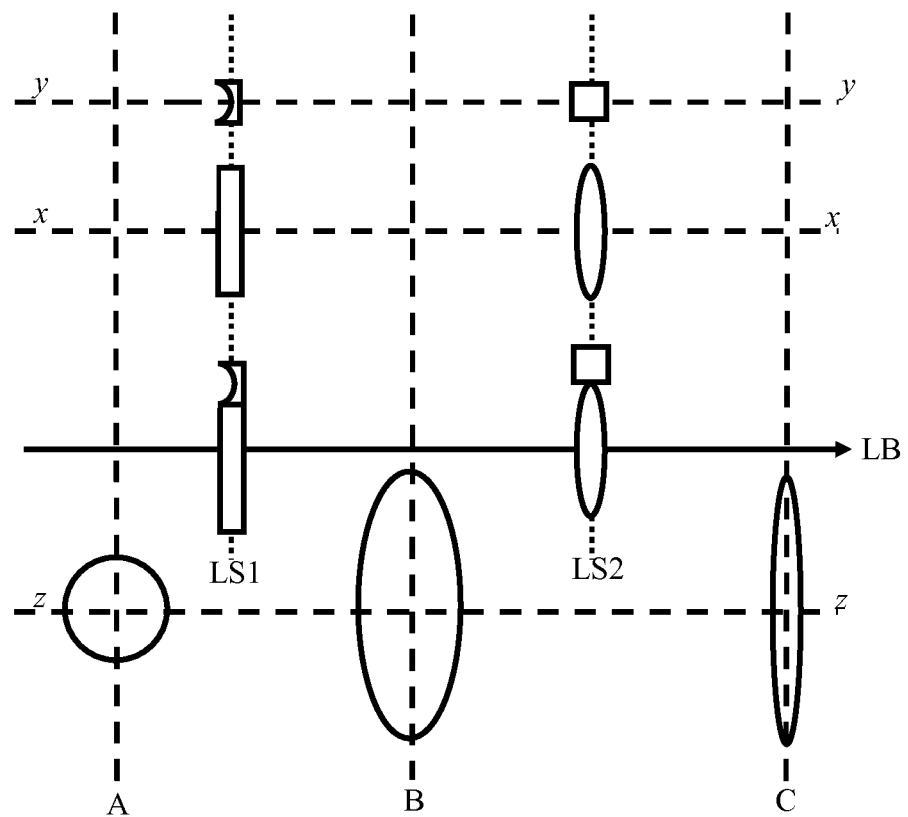
FIG. 6 is a diagram showing the operating principle of an optical assembly for beam modification according to one embodiment of the present invention.

FIG. 6 schematically illustrates the operating principle of the optical assembly of one embodiment of the present invention. Shown in this figure is a circular laser beam passing through a first lens LS1 and a second lens LS2. Shown along line xx is the cross-section of the lenses perpendicular to axis x, along line yy is the cross-section of the lenses perpendicular to axis y, and along line zz is the cross-section of the beam perpendicular to axis z (i.e., the propagation direction of the laser beam). Thus, lens LS1 has a modified cylindrical, diverging surface that increases the beam length L(LB) and alters the intensity distribution in the length direction from S-mode to a flat-top-mode. Lens LS2, being a cylindrical lens, only focuses the laser beam in the width direction to obtain a narrow beam while maintaining the S-mode intensity distribution in the width direction. It is to be understood that the lens LS2 may or may not alter the beam profile in the width direction (y axis) from one S-mode to another S-mode. For example, in one embodiment, the lens LS2 narrows the Gaussian profile of the beam in the width direction to obtain an output beam having a narrower Gaussian profile to be delivered to the glass surface.

It is also possible to make a single lens that performs both functions (i) and (ii) described above.

The lenses can be made with materials suitable for the wavelength of the laser beam. For $CO_2$ lasers, refractive lenses can be made of germanium, ZnSe, and the like. Reflective lenses or optical gratings can be used for the present invention as well.

One skilled in the art of optics, in the light of the teachings herein, can design and make lenses with the proper surface profile, dimensions, material choice, and assemble them into a module that suit the needs of the present invention.

VI. Motion of the Laser Beam and Exposure

During the scoring process, only part of the surface of the glass sheet is exposed to the laser beam. The exposed surface has a length L(EA) and a width W(EA). If the full laser beam is located within the surface of the sheet, the exposed area is perfectly flat and perfectly perpendicular to the laser propagation direction and remains perfectly stationery relative to the laser beam, L(EA)=L(LB) and W(EA)=L(LB).

As discussed supra, deviation of the exposed surface from a perfect plane to a certain extent is allowable without significant detrimental effect on the cutting speed, cutting precision and edge quality. Therefore, certain amount of bow of the sheet, and sheet motion in the direction of the laser propagation, can be tolerated.

In certain embodiments, the laser beam may move along the scoreline relative to the surface of the sheet to be scored, where the exposed area of the surface of the sheet is the total area the laser beam has covered during the laser travel. Thus, if the laser beam travels from one edge of the sheet to the other during the scoring process, the exposed area has a length L(EA) equivalent to the width of the sheet. In certain embodiments of the present invention, it is desirable that the laser beam is translated in the exposed area on the surface of glass sheet. To achieve successful, consistent, precise scoring with high quality edge, it is desired that the translation direction is essentially linear and parallel to the length direction of the laser beam, such that the width of the exposed area W(EA) approximates the width of the laser beam W(LB), i.e., W(EA) ≈W(LB). In the present disclosure, "W(EA)≈W(LB)" means the ratio W(EA)/W(LB) is at most 1.5. In certain embodiments, W(EA)/W(LB)≤1.4; in certain other embodiments, W(EA)/W(LB)≤1.3, in certain other embodiments, W(EA)/W(LB)≤1.2, in certain other embodiments W(EA)/W(LB) ≤1.1, in certain other embodiments W(EA)/W(LB)≤1.05.

The translation speed of the laser beam relative to the surface of the glass sheet to be scored is defined as the scoring speed. In certain embodiments of the present invention, successful scoring can be achieved at a scoring speed of at least 300 mm/second when the velocity of the glass sheet relative to the earth is essentially zero, such as when the glass sheet is placed on a stationery stage for off-the-draw finishing. In certain other embodiments, successful scoring can be achieved at a scoring speed of at least 750 mm/second when the velocity of the glass relative to the earth is non-zero, such as when the glass is moving in a production line (e.g., in the bottom of the draw in a fusion down-draw process).

The high scoring speed is enabled by, inter alia, the long length of the laser beam, the high aspect ratio, and the precise control of the laser intensity distribution in both the length and width directions of the laser beam.

It is desired that laser scoring of a glass sheet starts from a small flaw on or near one edge of the glass sheet. The flaw, which can be produced by mechanical scribing at the edge by a wheel, by a laser pulse, or other method, serves as the initiation point of the vent line to be created by the laser beam.

While a single-pass laser exposure is sufficient for successful formation of a vent in many embodiments, it is desired in certain embodiments multiple passes of laser exposure be carried out along the same scoreline, either to obtain a deeper vent, or to obtain a direct splitting of the glass sheet without further bending described in greater detail infra. Multiple passes can be advantageously used where the passes can be precisely repeated, such as where the glass sheet is maintained substantially stationary relative to the earth.

VII. Cooling Fluid and Cooling Process

As discussed supra, in certain embodiments, albeit not always required, it is desired that a cooling fluid is delivered to the exposed area immediately upon laser exposure. The cooling is beneficial for the formation of a laser vent necessary for controlled, precision, scoring.

The cooling fluid can be a gas, a liquid, or a mixture or a combination thereof. Desirably, the cooling fluid does not contaminate the glass surface, which is of particular importance for LCD glass substrates. Thus, the cooling fluid can be a cold air jet, a cold $N_2$ jet, a water jet, and the like. Upon cooling, a vent along the scoreline with desired depth in the exposed area of the glass sheet surface is formed.

A nozzle trailing the laser beam can be used to deliver the cooling fluid to the glass surface.

VIII. Bending

As mentioned supra, upon laser exposure, with or without cooling, the glass sheet may break or split along the scoreline to form two separate pieces of glass. However, this is not always desirable and possible, especially where multiple passes of laser exposure cannot be carried out precisely. With a vent along the scoreline, splitting of a glass sheet can be achieved by the application a bending moment.

IX. Splitting

High quality of the split edges of the glass sheets achievable by the present invention is characterized by a low total waviness. For a glass sheet having a scored edge of at least 2000 mm, even at least 2500 mm, even at least 2800 mm, even at least 3000 mm, the present invention can achieve a total waviness of at most 50 µm, in certain embodiments at most 40 µm. This is believed to be attributable, in part, to the S-mode intensity profile in the width direction and the flat-top-mode intensity profile in the length direction of the laser beam. For large size glass sheet, total waviness from one end of the scored edge to the other of at most 50 µm a significant technical challenge. It is believed the present invention, with the precision achieved by the choice of beam profile, can achieve such stringent requirements.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for splitting a sheet, comprising the following steps:
   (I-1) providing a circular laser beam having a diameter D(CLB) and an energy distribution in S-mode along any diameter thereof;
   (I-2) converting the circular laser beam into an elongated laser beam having a width W(LB) and a length L(LB) where intercepted by a surface of the sheet by passing the circular laser beam through an optical assembly adapted for maintaining the energy distribution in S-mode along the width, and transforming the energy distribution in S-mode to a flat-top-mode profile along the length;
   (II) exposing part of the surface of the sheet along a scoreline to the laser beam and causing the temperature of the exposed area to rise, wherein the total exposed area has a width W(EA), a length L(EA), W(EA)≈W(LB), and the scoreline is within the exposed area and is essentially parallel to L(LB); and
   (III) splitting the sheet substantially linearly along the scoreline,
   wherein the laser beam is generated by a continuous wave $CO_2$ laser.

2. A process according to claim 1, wherein step (II) comprises the following steps:
   (II-1) translating the laser beam in a direction essentially parallel to L(LB) along a scoreline in the exposed area on the surface of the sheet.

3. A process according to claim 2, wherein in step (II-1), the translation speed of the laser beam is at least 750 mm/s.

4. A process according to claim 1, wherein in step (I), the laser beam provided has an aspect ratio of at least 30.

5. A process according to claim 1, wherein in step (I), the laser beam provided has a width in the range of from 0.5 mm to 3 mm.

6. process according to claim 1, wherein the sheet consists essentially of an inorganic glass material, glass-ceramic material or ceramic material.

7. A process according to claim 6, wherein in step (III), the edge of the split glass sheets along the scoreline has a total waviness of not more than 50 µm.

8. A process according to claim 6, wherein L(EA)≥2000 mm.

9. A process according to claim 1, further comprising the following step (IIa) between step (II) and step (III):
   (IIa) cooling at least part of the exposed area by a fluid immediately upon exposure.

10. A process according to claim 9, further comprising the following step (IIb) between step (II) and step (III):
    (IIb) bending the glass sheet along the scoreline.

11. A process according to claim 1, wherein in step (I-2), the optical assembly is chosen such that W(LB)<D(CLB).

12. A process according to claim 1, wherein in step (I-2), the optical assembly comprises a first lens operating to (a) elongate the dimension of the beam in the direction of L(LB) and (b) transform the energy distribution profile from S-mode to flat-top-mode in the direction of L(LB), and a second lens operating to decrease the dimension of the circular laser beam in the direction of W(LB).

13. A process according to claim 12, wherein in step (I-2), the first lens is a diverging modified cylindrical lens, and the second lens is a focusing cylindrical lens.

14. A process according to claim 1, wherein in step (I-2), the optical assembly comprises a single lens operating to (i) decrease the dimension of the circular laser beam in the direction of W(LB), and (ii) increase the dimension of and transform the energy distribution from S-mode to flat-top-mode the circular laser beam in the direction of L(LB).

* * * * *